(12) United States Patent
Fujimura et al.

(10) Patent No.: US 10,859,774 B2
(45) Date of Patent: Dec. 8, 2020

(54) OPTICAL MODULE (71) Applicant: SUMITOMO ELECTRIC INDUSTRIES, LTD., Osaka (JP)

(72) Inventors: Yasushi Fujimura, Osaka (JP); Munetaka Kurokawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/244,296

(22) Filed: Jan. 10, 2019

(65) Prior Publication Data
US 2019/0212506 A1 Jul. 11, 2019

(30) Foreign Application Priority Data

Jan. 10, 2018 (JP) ................................. 2018-002075

(51) Int. Cl.
*G02B 6/36* (2006.01)
*G02B 6/136* (2006.01)
*G02B 6/42* (2006.01)
*H04B 10/00* (2013.01)
*G02B 6/28* (2006.01)

(52) U.S. Cl.
CPC ......... *G02B 6/4243* (2013.01); *G02B 6/4216* (2013.01); *G02B 6/4239* (2013.01); *G02B 6/2813* (2013.01); *G02B 6/4213* (2013.01); *G02B 6/4253* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,666,449 A * | 9/1997 | Sawae | ...................... | G02B 6/30 385/49 |
| 6,193,421 B1 * | 2/2001 | Tamekuni | ............ | G02B 6/3846 385/137 |
| 6,550,983 B1 * | 4/2003 | Gilliland | .............. | G02B 6/4204 385/88 |
| 6,848,834 B1 * | 2/2005 | Roehrs | ................... | G02B 6/383 385/59 |
| 2001/0055449 A1 * | 12/2001 | Sherrer | ................ | G02B 6/3838 385/84 |
| 2004/0017978 A1 * | 1/2004 | Kuhara | ................ | G02B 6/4214 385/49 |

(Continued)

FOREIGN PATENT DOCUMENTS

JP H10-154849 A 6/1998

*Primary Examiner* — Eric Wong
(74) *Attorney, Agent, or Firm* — Baker Botts L.L.P.; Michael A. Sartori (57) ABSTRACT

An optical module that includes a shell, an optical fiber, a coupling portion, and a ferrule is disclosed. The shell installs an optical device, for instance, a multi-mode interference (MMI) device therein. The optical fiber in a tip thereof is optically coupled with the optical device within the shell. The coupling portion has a cylindrical shape with a bore having an axis and secures the optical fiber, where the coupling portion is attached to the shell. The ferrule, which is secured in the coupling portion, has a pillared shape with a diameter that is slightly smaller than a diameter of the bore of the coupling portion. The ferrule has a groove that receives and secures the optical fiber therein. The filler fills the groove and fixes the optical fiber in the groove.

4 Claims, 9 Drawing Sheets

(56) References Cited

U.S. PATENT DOCUMENTS

| | | | |
|---|---|---|---|
| 2013/0121656 A1* | 5/2013 | Chen | G02B 6/4471 385/135 |
| 2014/0010499 A1* | 1/2014 | Suematsu | G02B 6/3885 385/65 |
| 2014/0115936 A1* | 5/2014 | Kenney | F41A 3/66 42/16 |
| 2016/0018604 A1* | 1/2016 | Gurreri | G02B 6/3865 385/58 |
| 2016/0047998 A1* | 2/2016 | Amirkiai | G02B 6/43 385/14 |

* cited by examiner

OPTICAL MODULE

CROSS REFERENCE TO RELATED APPLICATION

The present application is based on and claims benefit of priority of Japanese Patent Application No. 2018-002075, filed on Jan. 10, 2018, the entire content of which is incorporated herein by reference.

BACKGROUND OF THE INVENTION

1. Field of Invention

The present invention relates to an optical module, in particular, an optical module that is applicable to a coherent optical communication system.

2. Related Background Arts

A Japanese Patent Application laid open No. JP-H10-154849A has disclosed a semiconductor laser module having a resin shell. The laser module disclosed therein includes a semiconductor laser diode (LD) encapsulated within the resin, an optical fiber inserted within the shell to optically couple with the LD, and a support for securing the optical fiber. The optical fiber in a tip thereof is inserted within the shell; while, the support is secured by a cylindrical member that protrudes from the resin shell with an elastic adhesive therebetween. The adhesive encloses the shell.

Thus, an optical module generally has a configuration where an optical fiber coupled with an optical device by a tip end thereof is drawn within the shell, and the shell is filled with an encapsulant such as adhesive and/or solder, which may seal components within the shell. When two or more optical fibers are drawn within the shell, a cylindrical member becomes inevitable to enlarge a bore thereof, which makes hard for a filler of a sealant to be stably applied within the bore. Excess filler spreads out in areas where other components are to be installed, while, insufficient filler results in degraded air-tightness of a shell.

SUMMARY OF THE INVENTION

An aspect of the present invention relates to an optical module that comprises a shell, an optical fiber, a coupling portion, and a ferrule. The shell installs an optical device, for instance, a multi-mode interference device therein. The optical fiber in a tip thereof is optically coupled with the optical device within the shell. The coupling portion, which has a cylindrical shape with a bore having an axis thereof, secures the optical fiber and is attached to the shell. The ferrule, which is secured in the coupling portion, has a pillared shape with a diameter that is slightly smaller than a diameter of the bore of the coupling portion. The ferrule has a groove that receives and secures the optical fiber therein through filler.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments according to the present embodiment will be described referring to accompanying drawings. However, the present invention is not restricted to those embodiments and has a scope defined in claims attached hereto and includes all changed and modification within the scope of the claims and equivalents to the claims. Also, in the description of the drawings, numerals or symbols same with or similar to each other will refer to elements same with or similar to each other without duplicating explanations.

Figure 1:
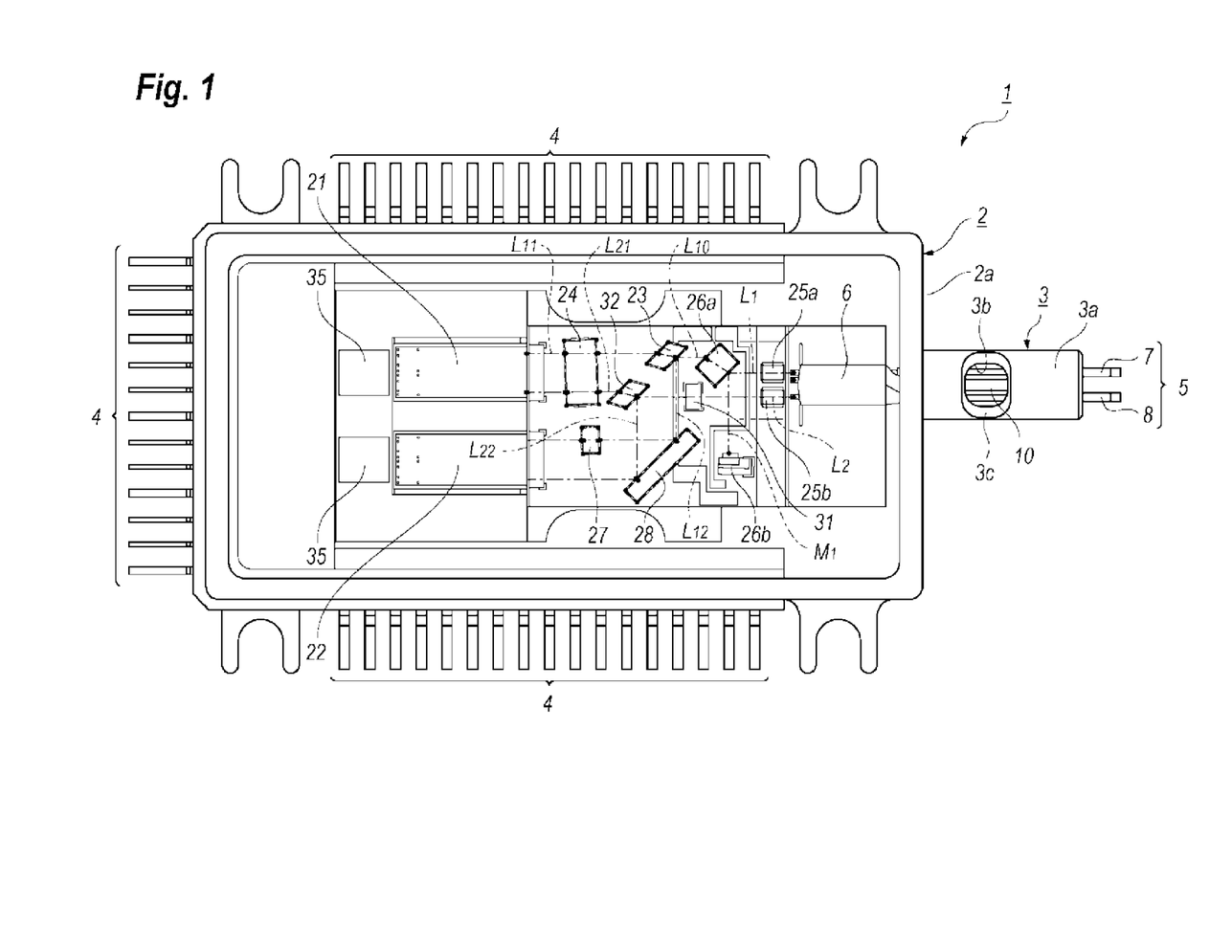
FIG. 1 a plan view showing an inside of an optical module according to the first embodiment of the present invention.
Figure 2:
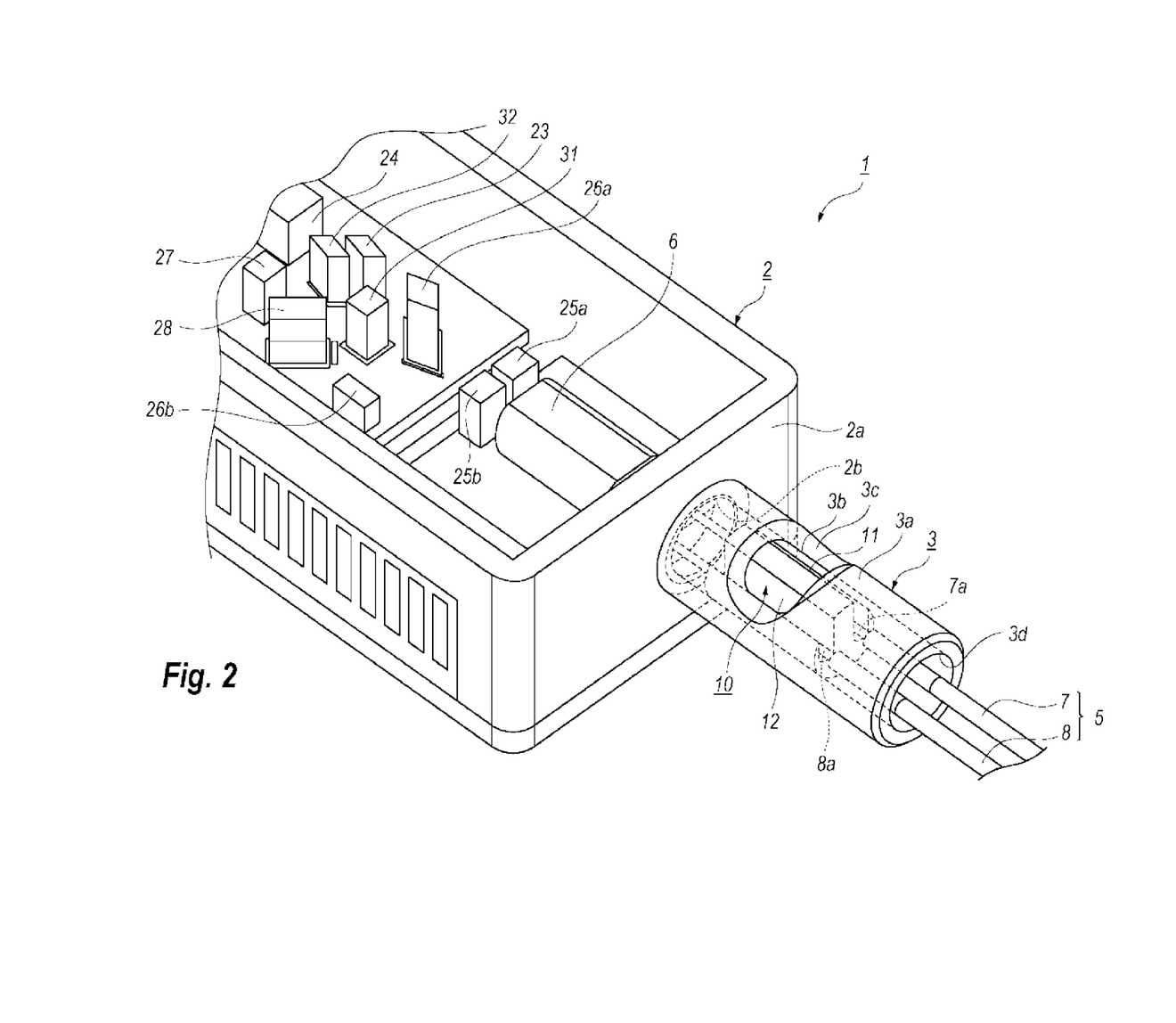
FIG. 2 is a perspective view showing a front wall of a shell to which a coupling portion securing a set of fibers is attached and through which the set of the fibers are guided within the shell.

FIG. 1 is a plan view showing an inside of an optical module 1 according to the present invention, which schematically shows a coupling relation between elements installed within the optical module 1, and FIG. 2 magnifies a coupling portion 3 which secures optical fibers, 7 and 8. The optical module 1 of the present embodiment is a type of, what is called, coherent receive module generally called as an integrated coherent receiver (ICR). The optical module 1 may recover information contained in a signal beam by performing interference between the signal beam $L_1$ and a local beam $L_2$. The recovered information is externally output from the optical module 1 by converting into an electrical signal or electrical signals.

The optical module 1 provides a box-shaped shell 2 and the coupling portion 3 attached to the shell 2, where the shell 2 and the coupling portion 3 may be made of materials having thermal expansion coefficients substantially same with each other, typically Kovar™. One of side walls 2a of the shell 2 that provides a window 2b attaches the coupling portion 3 thereto such that the coupling portion 3 having a cylindrical shape outwardly protrudes from the side wall 2a. The coupling portion 3 provides an opening 3b in one side 3a thereof to inject filler H within the coupling portion 3 therethrough. The opening 3b provides a flared edge 3c that makes a substantial angle against the side 3a, or inclined with the side 3a.

A set of fibers 5 set within a ferrule 10 pierces a bore 3d of the coupling portion 3 and the window 2b in the side wall 2a; that is, the ferrule 10 is set within the bore 3d of the cylinder of the coupling portion 3, whereby the set of the fibers 5 may be secured therein. The set of the fibers 5 provides a capillary 6 in a tip thereof and includes a single mode fiber (SMF) 7 and a polarization maintaining fiber 8. The SMF 7 carries the signal beam $L_1$, while, the PMF 8 carries the local beam $L_2$, where both beams, $L_1$ and $L_2$, are guided within the shell 2 through the set of the fiber 5.

The shell 2 provides terminals 4 in one of the side walls except for the former side wall 2a, where the terminals 4 are extracted from a lowest ceramic constituting multi-layered ceramics forming the side walls. The terminals 4 include those extracting the electrical signals corresponding to the information recovered from the signal beam $L_1$, those for supplying biases to devices installed within the shell 2, and the ground.

The optical module 1 according to the present embodiment further provides two multi-mode interference (MMI) devices, 21 and 22, as optical active devices, which are a type of optical 90° hybrid. The MMI devices, 21 and 22, are disposed side by side along a lateral direction of the shell 2, where the lateral direction is parallel to the side wall 2a. The optical module 1 further provides, in order to optically couple the SMF 7 and the PMF 8 with input ports of the MMI devices, 21 and 22, a collimating lenses, 25a and 25b, a beam splitter (BS) 26a, a polarization beam splitter (PBS) 23, a skew adjustor 24, a reflector 28, and a half-wavelength ($\lambda/2$) plate 27.

The collimating lens 25a, which is disposed on an optical axis of the signal beam $L_1$ output from the SMF 7, which is a divergent beam at the tip of the SMF 7, converts the signal beam $L_1$ into a collimating beam. The BS 26a splits the signal beam $L_1$ coming from the collimating lens 25a into a signal beam $L_{10}$ and a monitored beam $M_1$, where the former beam $L_{10}$ transmits the BS 26a, while, the monitored beam $M_1$, which is reflected by the BS 26a, advances toward a direction perpendicular to the signal beam $L_1$. Provided on an optical axis of the monitored beam $M_1$ is a monitor photodiode (mPD) 26b that generates an electrical signal corresponding to strength of the monitored beam $M_1$ sensed thereby.

The PBS 23, which is disposed on an optical axis of the signal beam $L_{10}$ and provides an incident surface optically coupled with the BS 26a, splits the signal beam $L_{10}$ into two beams, $L_{11}$ and $L_{12}$, by an even ratio, 50:50, where the former beam $L_{11}$ has an X-polarization that is parallel to a bottom of the shell 2, while the latter $L_{12}$ has a Y-polarization that is perpendicular to the bottom of the shell 2. The signal beam $L_{11}$ with the X-polarization enters the MMI device 21 passing the PBS 23, while the signal beam $L_{12}$ with the Y-polarization advances toward the reflector 28 bent in the optical axis thereof by 90° at the PBS 23.

The skew adjustor 24 is disposed on an optical path connecting the PBS 23 with the MMI device 21 and on the optical axis of the input port of the MMI device 21. The signal beam $L_{11}$ with the X-polarization passes the skew adjustor 24, where the skew adjustor 24, which is a rectangular block made of silicon (Si), may compensate a phase delay of the signal beam $L_{12}$ against the other signal beam $L_{11}$ caused by a difference between optical paths of the signal beams, $L_{11}$ and $L_{12}$, by equivalently lengthening the optical path of the signal beam $L_{11}$.

The $\lambda/2$ plate 27, which is disposed between the reflector 28 and the input port of the MMI device 22, transmits the beam $L_{12}$ and converts the polarization thereof to the other polarization. The $\lambda/2$ plate 27 rotates the polarization angle of the signal beam $L_{12}$ by 90°, which means that the signal beam $L_{12}$ passing the $\lambda/2$ plate 27 aligns the polarization thereof with the that of the other signal beam $L_{11}$ passing the PBS 23. The signal beam $L_{12}$, passing the $\lambda/2$ plate 27, enters the MMI device 22 concentrated by a lens.

The optical module 1 implements a collimating lens 25b, a polarizer 31, a beam splitter (BS) 32, skew adjustor 24, and the reflector 28 as components for optically coupling the PMF 8 with the input ports of the MMI devices, 21 and 22. The collimating lens 25b, which is optically coupled with the PMF 8 and disposed on the optical path of the local beam $L_2$, converts the local beam $L_2$ into a collimated beam and provides thus converted collimated beam to the polarizer 31. The polarizer 31, which is coupled with the collimating lens 25b and disposed on the optical path of the local beam $L_2$, polarizes the polarization of the local beam $L_2$. Even when the polarization of the local beam $L_2$, which is maintained within the PMF 8, is deviated or rotated during the assembly of the optical module 1, the polarizer 31 may extract or re-arrange the polarization of the local beam $L_2$.

When a semiconductor laser diode (LD) is applied as an optical source of the local beam $L_2$, an LD generally outputs a laser beam with an elliptical polarization with a major axis thereof parallel to an active layer of the LD. However, some LDs intentionally induce stresses in the active layer in order to enhance an oscillation stability and reliability of materials thereof and to tune a wavelength of the beam output therefrom. The laser beam derived from such an LD sometimes shows an elliptical polarization but with a relatively longer minor axis. Even for a beam with such an elliptical polarization, the polarizer 31 may re-arrange the polarization of the local bean $L_2$ from such an elliptical polarization to a linear polarization with a designed direction, for instance, parallel to a bottom of the shell 2.

The BS 32 splits the local beam $L_2$ output from the polarizer 31 into two beams by an even ratio, namely, 50:50. One of the beams $L_{21}$ passing the BS 32 enters the MMI device 21; while the other portion $L_{22}$ directs the reflector 28 reflected by the BS 32. The skew adjustor 24, which is disposed on an optical path connecting the input port of the MMI device 21 and the BS 32, which is provided on the optical axis of the input port of the MMI device 21, transmits the local beam $L_{21}$. The skew adjustor 24 may compensate a phase delay of the local beam $L_{22}$ against the other local beam $L_{21}$ caused by an optical path difference therebetween by equivalently lengthening the optical path for the local beam $L_{21}$. The local beam $L_{21}$ is concentrated onto the input port of the MMI device 21 passing the skew adjustor 24.

The other local beam $L_{22}$ advances the input port of the MMI device 22 reflected by the reflector 28. The local beam $L_{22}$ in the optical axis thereof after reflected by the reflector 28 is aligned with the optical axis of the input port of the MMI device 22. The local beam $L_{22}$ is concentrated on the input port of the MMI device 22 reflected by the reflector 28.

Thus, the signal beam $L_1$ and the local beam $L_2$ each entering within the shell 2 are split into respective two portions and provided to the respective two MMI devices, 21 and 22. The MMI devices, 21 and 22, are primarily made of, for instance, indium phosphide (InP) that monolithically integrates photodiodes (PDs). The MMI devices, 21 and 22, may extract, from the signal beam $L_1$, an in-phase component with respect to the local beam $L_2$ and a quadrature component against the local beam $L_2$ by performing interference between the signal beam $L_1$ and the local beam $L_2$. That is, the in-phase component is a component of the signal beam $L_1$ whose phase matches with that of the local beam $L_2$, while, the quadrature component of the signal beam $L_1$ whose phase is orthogonal to that of the local beam $L_2$. The PDs implemented within the MMI devices, 21 and 22, generate respective photocurrents corresponding to the in-phase component and the quadrature component. The photocurrents are output from the terminals 4 after converted into voltage signals by the amplifier 35 also installed within the shell 2.

Figure 3:
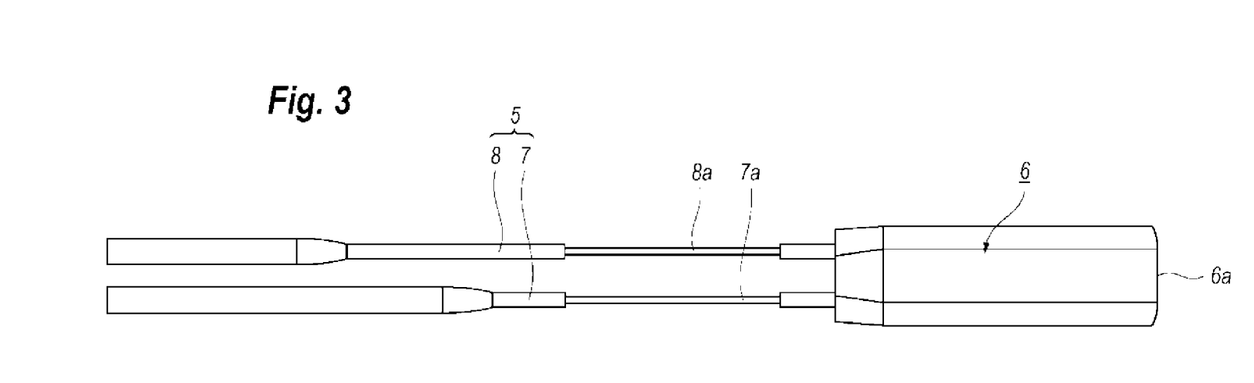
FIG. 3 shows the set of the fibers with a capillary.
Figure 4:
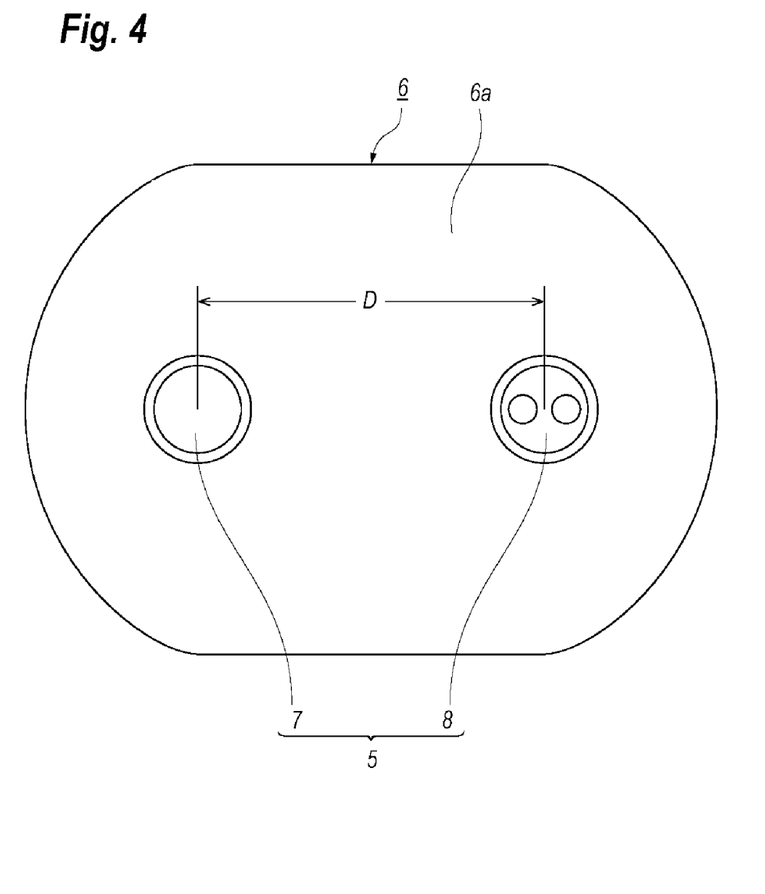
FIG. 4 is cross sectional view of the capillary and the set of the fibers secured by the capillary.

Next, details of the coupling portion 3 through which optical fibers are drawn within the optical module 1. FIG. 3 is a side view showing a capillary 6 and the set of the fibers 5 including the SMF 7 and the PMF 8, and FIG. 4 is a front view showing an end 6a of the capillary 6 that exposes the tip ends of the SMF 7 and the PMF 8. The capillary 6, which secures ends of the SMF 7 and the PMF 8, may be made of, for instance, ceramic such as zirconia and/or glass, specifically, silica, borosilicate crown glass, and so on. The end 6a of the capillary 6 has a pair of arched sides and a pair of linear sides each connecting the arched sides. Two fibers, 7 and 8, are secured by the capillary 6 with a distance D therebetween of, for instance, 250, 500, or 750 μm.

Figure 5:
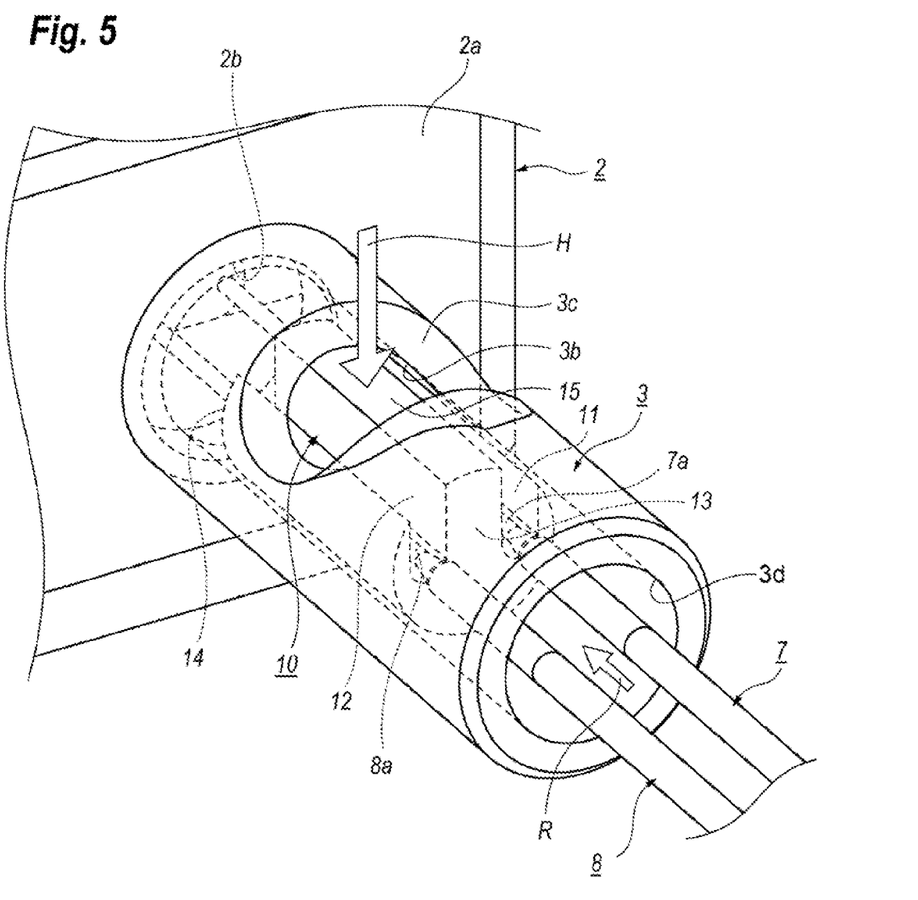
FIG. 5 is a perspective view of the coupling portion that assembles the ferrule for securing the set of the fibers.
Figure 6:
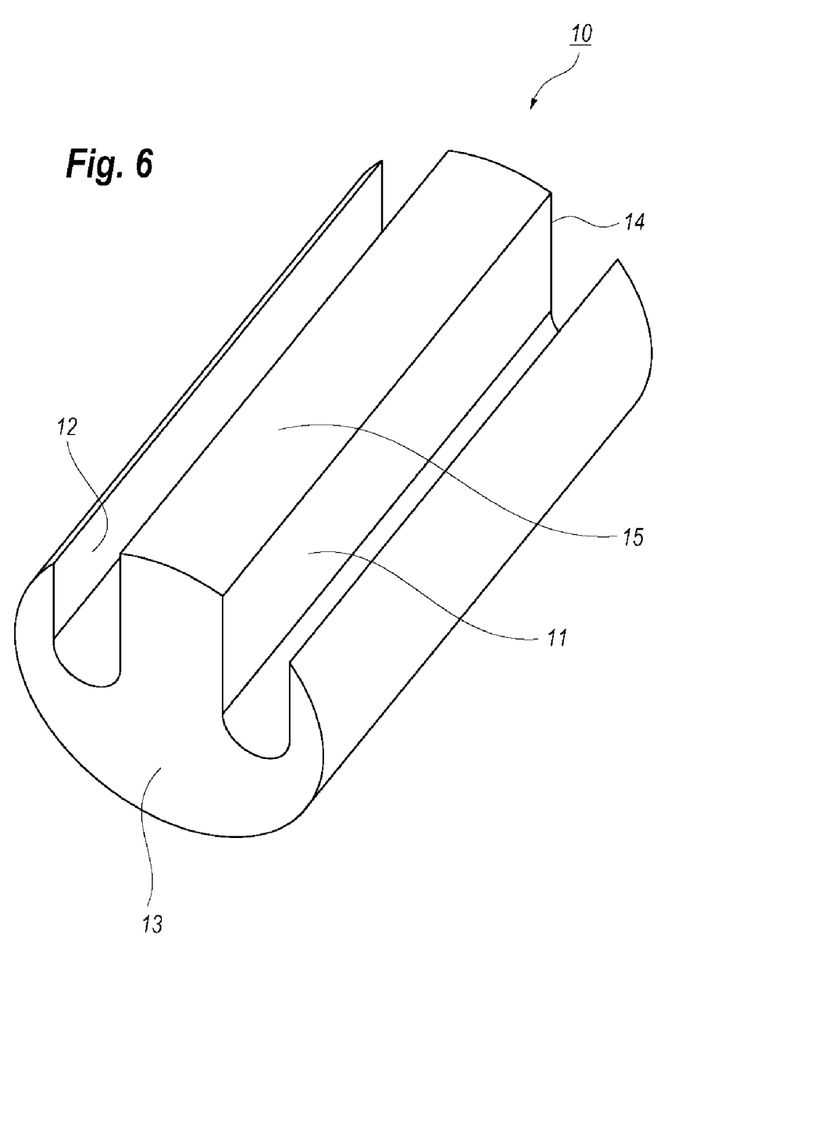
FIG. 6 is a perspective view of the ferrule.

FIG. 5 is a perspective view of the coupling portion 3 that shows the ferrule 10 set within the bore 3d of the coupling portion 3, and FIG. 6 is a perspective view showing the ferrule 10. The ferrule 10 may be made of material whose thermal expansion coefficient substantially equal to those of the shell 2 and the coupling portion 3, where the ferrule 10 of the present embodiment is made of Kovar™ same with the shell 2 and the coupling portion 3. The ferrule 10, which has a pillared shape with a pair of flattened ends, 13 and 14, with an outer diameter thereof substantially equal to, or slightly smaller than an diameter of a bore 3d of the coupling portion 3. The ferrule 10 may fill the bore 3d to save filler H filling grooves, 11 and 12.

The ferrule 10 provides a pair of grooves, 11 and 12, for setting the bared fibers, 7a and 8a, therein whose glassy bodies are exposed by peeling resin coatings thereof. The grooves, 11 and 12, extend parallel to axes of the bared fibers, 7a and 8a, between the ends, 13 and 14, of the ferrule 10, and set those bared fibers, 7a and 8a, therein which may reduce rooms to be filled with filler H and save the filler H. The groove 11 sets the SMF 7a therein, while, the other groove 12 sets the PMF 8a therein.

Figure 7:
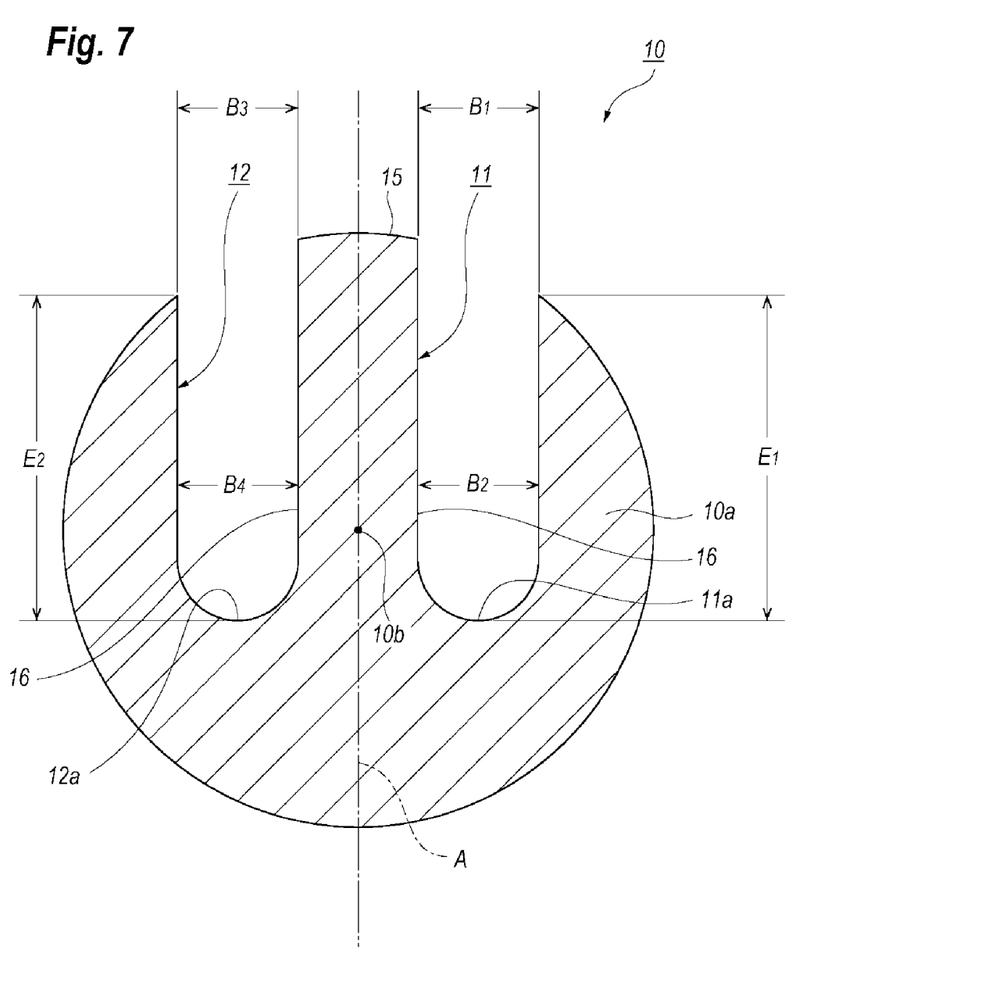
FIG. 7 is a cross sectional view of the ferrule according to the first embodiment of the invention.

FIG. 7 shows a cross section 10a of the ferrule 10 taken by a plane perpendicular to the axis of the cylindrical coupling portion 3. The grooves, 11 and 12, which are arranged in plane symmetry with respect to a virtual plane A passing a center 10b of the ferrule 10, extends from a surface 15 forming sides 16 parallel to each other along the virtual plane A to form concave bottoms, 11a and 12a, respectively, where the concave bottom 11a of the groove 11 fits an outer shape of the bared SMF 7a to stably set the SMF 7a therein and leave a limited gap therebetween. The concave bottom 11a exceeds the center 10b of the ferrule 10, that is, the groove 11 has a depth $E_1$ greater than a radius of the ferrule 10. Also, the groove 11 has a width $B_1$ that is substantially equal to a width $B_2$ of the concave bottom 11a. That is, the groove 11 may have a constant width from the surface 15 to the bottom 11a thereof, and this constant width is substantially equal to, or slightly greater than a diameter of the bared SMF 7a. The other groove 12 for the bared PMF 8a has same arrangements of the groove 11, and may have a constant width, $B_3$ or $B_4$, that is substantially equal to or slightly greater than a diameter of the bared PMF 8a.

Next, procedures of drawing the SMF 7 and the PMF 8 within the optical module 1 using the ferrule 10 will be described. Referring to FIG. 2 again, the procedure first sets the SMF 7 in the bared fiber 7a within the groove 11 as removing the resin coating thereof and the PMF 8 in the bared fiber 8a within the groove 12 also by removing the resin coating thereof before the ferrule 10 is set within the coupling portion 3. Then, the procedure inserts the capillary 6 secured in the tips of the bared fibers, 7a and 8a, inside the shell 2, and fixes the capillary 6 to the shell 2 therein. Also, the ferrule 10 is adjusted in a position along the axis thereof such that the ferrule 10 appears in the opening 3b of the coupling portion 3.

Then, injecting the filler H within the grooves, 11 and 12, from the opening 3b, and concurrently injecting resin R within the bore 3d of the coupling portion 3 from the end thereof, the ferrule 10 may be fixed within the bore 3d of the coupling portion 3 and the bared fibers, 7a and 8a, may be secured within the grooves, 11 and 12. The resin R may be a type of two-fluids mixing resin, such as 353ND™. Thus, both the filler H and the resin R reliably and rigidly secure the ferrule 10 with the coupling portion 3 and the bared fibers, 7a and 8a, within the grooves, 11 and 12.

Next, advantages of the optical module 1, in particular, the mechanism to assemble the ferrule 10 with the coupling portion 3, will be described. In the optical module 1 thus described, the cylindrical coupling portion 3, which has a bore 3d, receives the ferrule 10 within the bore 3d, and this ferrule 10 is inserted within the bore 3d such that the grooves, 11 and 12, in the ferrule 10 secures the SMF 7 and the PMF 8, by the respective bared fibers, 7a and 8a. Thus, the ferrule 10 may seal the bore 3d of the cylindrical coupling portion 3. This arrangement not only seals the shell 2 air-tightly by the coupling portion 3 but the air-tightness of the shell 2 may be realized by a limited filler, which means that excess filler is prevented to be spread into un-designed areas.

Also, the coupling portion 3 secures two or more fibers therein, and at least one of the fibers secured in the coupling portion 3 is the type of PMF 8. When a set of an SMF and a PMF is inserted into and secured by the coupling portion 3 without any ferrules, the cylindrical coupling portion 3 is inevitably sealed in rest rooms in the bore thereof except for the fibers. The optical module 1 according to the present invention, the cylindrical coupling portion 3 secures two fibers, 7 and 8, but the bore 3d thereof is primarily filled with the ferrule 10 with two grooves, 11 and 12, each setting the fibers, 7 and 8, therein; accordingly, the arrangement of the ferrule 10 and the cylindrical coupling portion 3 may save the filler to secure the fibers, 7 and 8, and reliably seal the shell 2 of the optical module 1.

The ferrule 10 provides the groove 11 and the other groove 12 for securing the SMF 7 and the PMF 8 therein in the respective bared forms, 7a and 8a. Thus, because the fibers, 7 and 8, are set within the respective grooves, 11 and 12, in the ferrule 10, and the ferrule 10 securing the fibers, 7 and 8, is inserted within the bore 3d of the coupling portion 3, the filler H to seal the shell 2 air-tightly may be saved. In particular, the grooves, 11 and 12, in the ferrule 10 has respective constant widths that are substantially same with diameters of the bared fibers, 7a and 8a, set therein. Accordingly, the ferrule 10 in the cross section thereof only provides the grooves, 11 and 12, for passing the bared fibers, 7a and 8a, and substantially no vacant areas are left, which may save the filler H to be filled within the vacant areas in the bore 3d of the cylindrical coupling portion 3.

The grooves, 11 and 12, extend between the ends, 13 and 14, of the ferrule 10, that is, the grooves, 11 and 12, pierce the ferrule 10 from the end 13 to the other end 14 along the axis of the cylindrical coupling portion 3, which may simplify the process of forming the ferrule 10 and realize precise dimensions for the grooves, 11 and 12.

The coupling portion 3 provides the opening 3b from which the ferrule 10, namely, the grooves, 11 and 12, are exposed, which makes possible for the filler H to be injected into the grooves, 11 and 12, through the opening 3b. Also, the shell 2, the coupling portion 3, and the ferrule 10 have respective thermal expanding coefficients substantially comparable to each other, which means that the shell 2 may be securely and air-tightly sealed even an ambient temperature varies. In the optical module 1 according to the present embodiment, those members of the shell 2, the cylindrical coupling portion 3, and the ferrule 10 are made of Kovar™.

Second Embodiment

Figure 8:
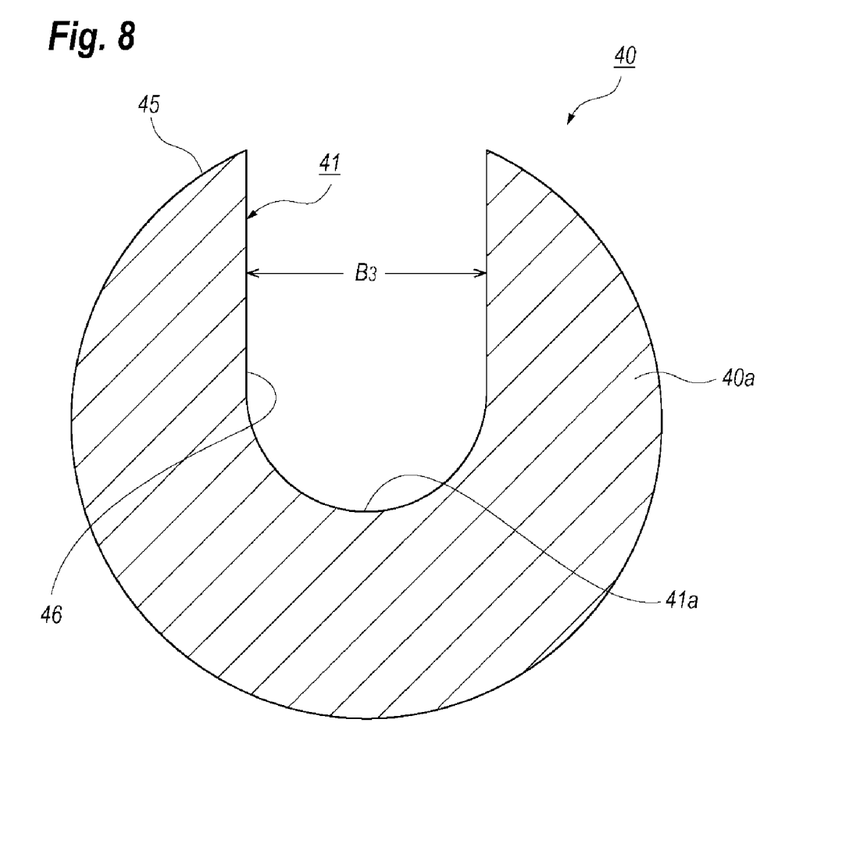
FIG. 8 is a cross sectional view of another ferrule according to the second embodiment of the present invention.

Next, another ferrule 40 according to the second embodiment of the present invention will be described referring to FIG. 8. The ferrule 40 of the second embodiment provides one groove 41 with a cross section and a width different from those of the first embodiment shown in FIG. 7. The groove 41 in the second embodiment, which sets one or more fibers therein, extends along the axis of the cylindrical coupling portion 3 between the ends of the ferrule 40. The groove 41 in a cross section 40a thereof, similar to the aforementioned embodiment, extends from the surface of the ferrule 40 reaching and exceeding the center of the ferrule 40 and has a concave bottom 41a and linear sides 46. The groove 41 has a width B3 between the liner sides 46, where the groove 41 has a width that is slightly wider than a diameter of one bared fiber, or comparable to a total width of two of bared fibers. Thus, the ferrule 40 in the second embodiment provides one groove 41 extending between the ends of the ferrule 40 along the axis of the cylindrical coupling portion 3. Setting one of more bared fibers in the groove 41 and inserting thus configured ferrule 40 within the bore 3d of the cylindrical coupling portion 3, the shell 2 may be securely and air-tightly sealed with the ferrule 40 independent of a number of the bared fibers.

Third Embodiment

Figure 9:
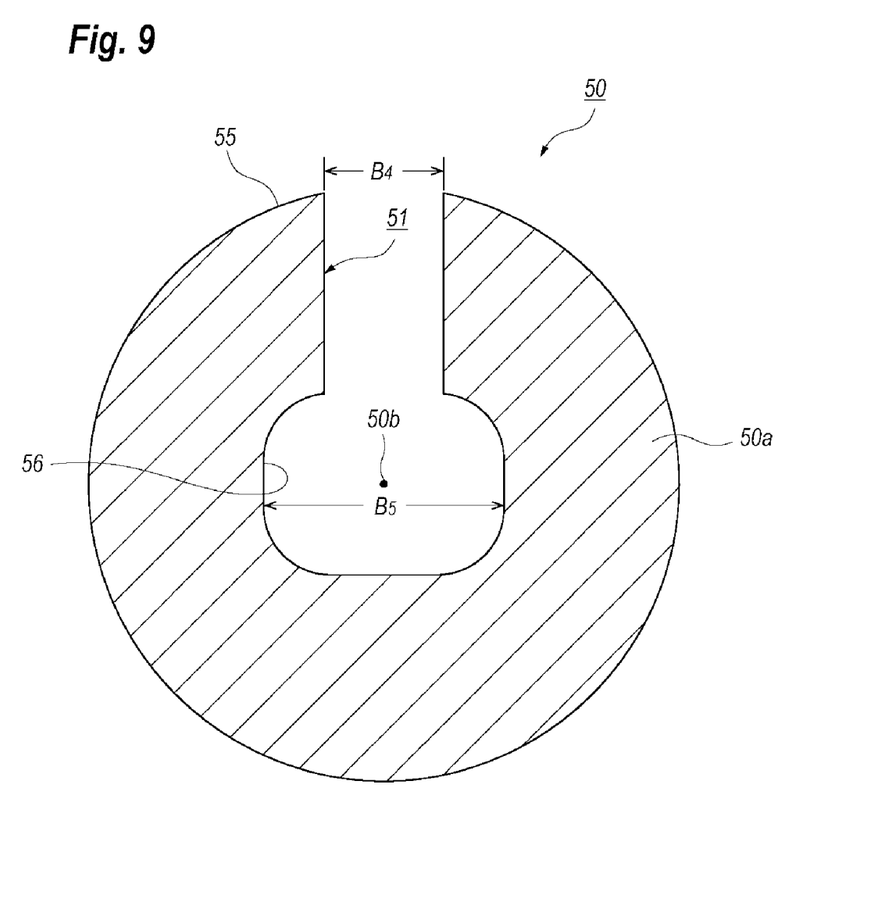
FIG. 9 is a cross sectional view of still another ferrule according to the third embodiment of the present invention.

Next, still another ferrule 50 according to the third embodiment of the present invention will be described referring to FIG. 9. The ferrule 50 of the present embodiment has features distinguishable from those of the aforementioned embodiments that the groove 51 in a cross section and dimensions thereof is different from the grooves, 11, 12, and 41. The ferrule 50 provides one groove 51 that receives two of more bared fibers. The groove 51 extends from the surface 55 of the ferrule 50 toward a center thereof, and provides a pocket 56 around a center 50b in the cross section 50a of ferrule 50, where the pocket 56 has a width $B_5$, or a diameter thereof, greater than a width $B_4$ of the groove 51 at the surface 55, where the latter width $B_4$ is slightly greater than the diameter of the bared fiber, which means that the bared fibers are easily set within the pocket 56 by inserting the bared fibers one by one, and the bared fibers once set within the pocket 56 is hard to escape therefrom. Also, the arrangement of the groove 51 and the pocket 56 of the present embodiment may also stably seal the shell 2 with limited filler H.

While particular embodiments of the present invention have been described herein for purposes of illustration, it will be understood by those skilled in the art that various modifications may be made, and equivalents may be substituted, without departing from the scope of the invention defined in attached claims. Additionally, many modifications may be made to adapt a particular situation to the teachings of the present invention without departing from the central inventive concept described herein. For instance, the embodiments concentrate on an optical module 1 with a type of coherent receiver module, which may be called as an intelligent coherent receiver (ICR); types, counts, and dispositions of optically active devices are optional. Also, the present invention may be applicable to other types of optical modules, such as transmitter optical sub-assembly (TOSA), receiver optical sub-assembly (ROSA), coherent optical sub-assembly (COSA) that integrates functions of a multi-level optical modulation and an optical receiver, which is often called as silicon photonics, and/or transmitter-receiver optical sub-assembly (I ROSA) that integrates a ROSA with a TOSA.

Also, the embodiments thus described implement a set of fibers including one SMF 7 and one PMF 8; but the optical module 1, or the coupling portion 3 with the ferrule 10 may provide three or more fibers. A COSA, or a TROSA explained above provides tree fibers for a local beam, a signal beam, and a modulated beam, which often request an enlarged opening in the coupling portion, through which the tree fibers are drawn within the shell. Even such a case, the coupling portion 3 providing the ferrule according to the present invention may stably seal the shell with limited filler. The ferrule for such an arrangement may provide one groove, or, grooves each corresponding to bared fibers. Also, the cross sectional shape, the dimensions, and the disposition thereof are optional depending on the number of the bared fibers. Therefore, it is intended that the present invention not be limited to the particular embodiments disclosed, but that the invention include all embodiments falling within the scope of the appended claims.

What is claimed is:

1. An optical module, comprising:
a shell that installs an optical device therein;
an optical fiber having a tip optically coupled with the optical device within the shell;
a coupling portion having a cylindrical shape with a bore having an axis and securing the optical fiber therein, the coupling portion being attached to the shell;
a ferrule secured in the coupling portion and having a pillared shape with a diameter that is slightly smaller than an inner diameter of the bore of the coupling portion, the ferrule having a groove that receives and secured the optical fiber therein through filler; and
another optical fiber;
wherein the optical fiber and the another optical fiber are secured in the groove of the ferrule,
wherein the optical fiber and the another optical fiber each have a bared fiber, the bared fibers being provided inside the groove,
wherein the groove extends from a surface of the ferrule to a center portion of the ferrule to form a pocket thereat, and
wherein the groove has a width at the surface measure along a direction perpendicular to the axis that is smaller than a width of the pocket measure along the direction of the axis.

2. The optical module according to claim 1,
wherein the groove extends from one end to another of the ferrule along the axis of the coupling portion.

3. The optical module according to claim 1,
wherein the coupling portion has an opening in a surface thereof, the opening exposing the groove in the ferrule.

4. The optical module according to claim 1,
wherein the shell, the coupling portion, and the ferrule have thermal expansion coefficients substantially same with each other.

* * * * *